June 17, 1952  H. E. HENRIKSEN  2,600,872
FLUID CONTROL VALVE
Filed March 31, 1945  2 SHEETS—SHEET 1

Inventor:
HARVEY E. HENRIKSEN,
By John H. Rouse,
Attorney.

June 17, 1952  H. E. HENRIKSEN  2,600,872
FLUID CONTROL VALVE
Filed March 31, 1945  2 SHEETS—SHEET 2
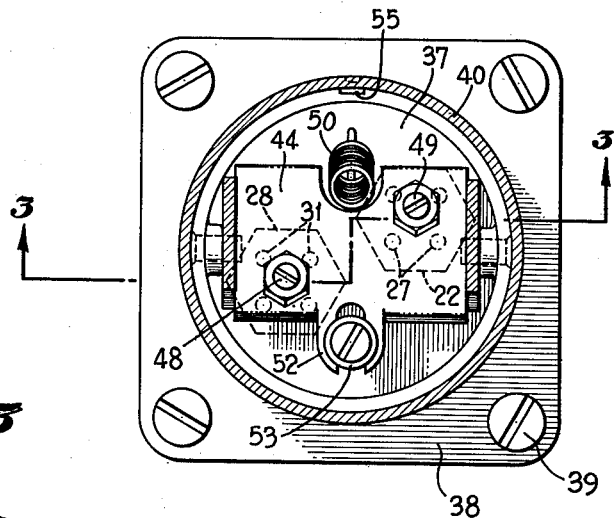
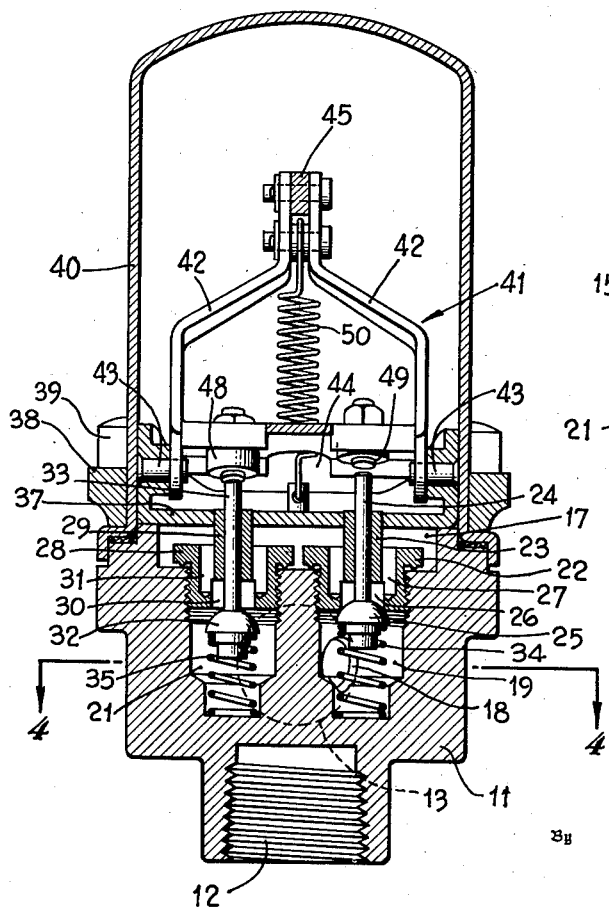
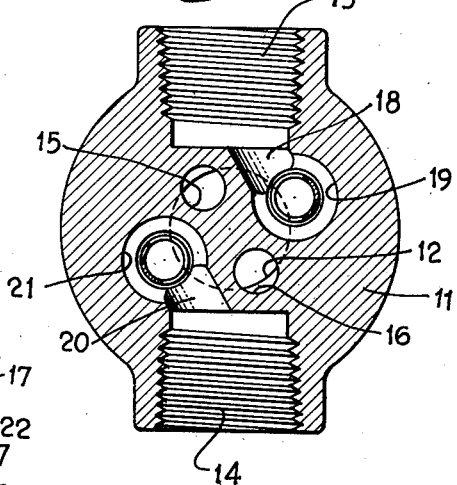
Inventor:
HARVEY E. HENRIKSEN,
John H. Rouse,
Attorney.

Patented June 17, 1952

2,600,872

UNITED STATES PATENT OFFICE 2,600,872

FLUID CONTROL VALVE

Harvey E. Henriksen, Glendale, Calif., assignor to General Controls Co., Glendale, Calif., a corporation of California Application March 31, 1945, Serial No. 585,948

6 Claims. (Cl. 277—21)

This invention relates to improvements in fluid-control valves and more particularly in valves of the motor-operated type adapted to control fluid-flow selectively between a common and a plurality of individual passages.

An object of the invention is to provide, in a valve of the character described and wherein the motor is contained in a chamber separated from the valve casing by a common wall, means so interconnecting the valve-closure means and the motor that, while the desired equalization of pressure between the motor-chamber and the interior of the casing is permitted, the motor is protected from such flow-velocity of the fluid as might affect the motor to reduce the flow-capacity and pressure-ratings of the valve; the motor further being protected from the harmful effect of foreign matter carried by the fluid.

Other objects and advantages of the invention will be found in the description, the drawing, and the claims; and, for full understanding of the invention, reference is to be had to the following detailed description and accompanying drawing, wherein:

Figure 2 is a transverse section taken along the line 2—2 of Fig. 1;

Figure 3 is a longitudinal section taken in a plane generally at right-angles to that of Fig. 1 and along the irregular line 3—3 of Fig. 2; and Figure 4 is a transverse section taken along the line 4—4 of Fig. 3; the cutting line also being indicated in Fig. 1.

Figure 1:
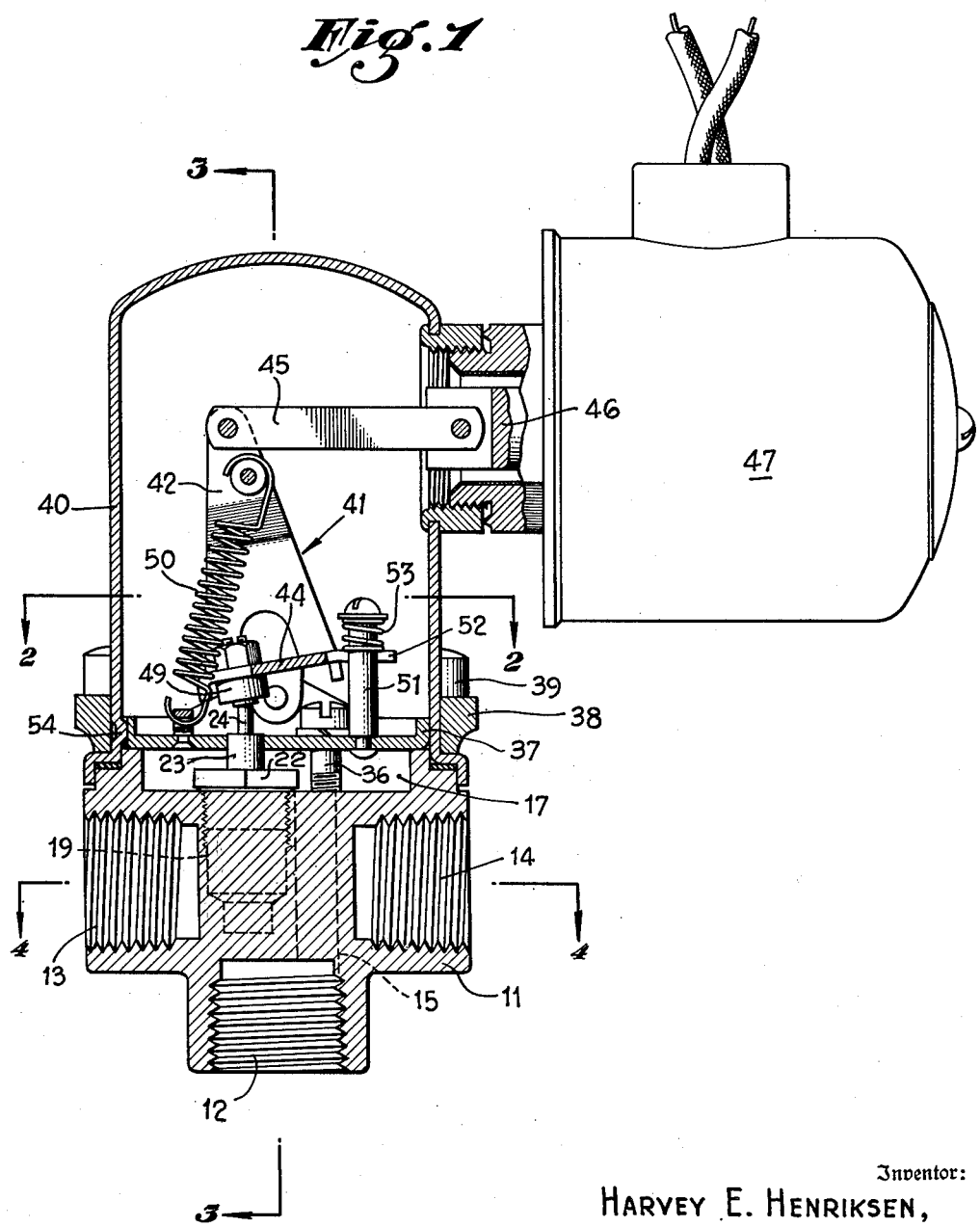
Figure 1 is a longitudinal sectional view of a three-way motor-operated valve embodying the invention.

In the drawing, the numeral 11 indicates a valve casing having, for conducting fluid with respect to the valve, a common threaded connection or passage 12 and a pair of independent threaded connections or passages 13 and 14. As is seen in Figs. 4 and 1, a pair of vertical passages 15 and 16 lead from the common connection 12 to a recess 17 formed in the top surface of the casing. As is also seen in Fig. 4, the connection 13 is connected by a short horizontal passage 18 to a bore 19 formed vertically in the bottom wall of the recess 17; the other connection 14 being connected by a passage 20 to a similar bore 21.

Threaded in the upper portion of bore 19 is a valve-port member 22 having a cylindrical projection 23 which is drilled to guidingly receive the stem 24 of a semispherical closure 25. This closure cooperates with a seat formed by the edge of a cylindrical recess 26 in the bottom of the port member; a plurality of vertical openings 27 providing communication between recess 26 and the casing-recess 17. Threaded in bore 21 is another valve-port member 28 identical in construction with the member 22 and having a projection 29, bottom recess 30, and openings 31; a closure 32, having a stem 33, similarly cooperating with this port member. Biasing the closures 25 and 32, respectively, toward seating position are compression springs 34 and 35.

Covering the recess 17, and secured to the casing by a screw 36 (Fig. 1), is a plate 37 which is apertured to receive the top portions of the port-member projections 23 and 29. This plate forms effectively an outer wall of the casing and serves to constitute the recess 17 a distribution chamber for the fluid controlled by the valve. Sealingly clamped by a ring 38 and screws 39 to the top of the valve casing, around plate 37, is a housing 40 wherein is mounted means for operating the valve-closures. This housing defines, with plate 37, a chamber which is in restricted fluid-communication with the distribution chamber 17 due to the loose fit of the projections 23 and 29 in the plate-openings; the fit being such as to permit gradual equalization of pressure between the chambers, but to prevent surge of fluid of a magnitude sufficient to materially influence the operating means.

Mounted on plate 37 is a lever or rocker generally indicated at 41 and comprising a pair of side arms 42 (pivoted at their lower ends on pins 43 secured in opposite raised flange portions of the plate) which are joined intermediate their ends by a bridge 44; the upper portions of the side arms being bent toward each other and connected by a link 45 to the plunger 46 of an electromagnetic solenoid 47, of conventional construction, sealingly mounted in an opening through a side wall of the housing. Mounted on the bridge 44 is a pair of adjustable elements 48—49 so positioned as to engage the tops of the closure-stems 24 and 33 in the rocking of the lever. Biasing the lever 41 in a direction to withdraw the plunger from the solenoid is a contractile spring 50 connected at its opposite ends to the lever and plate 37; movement of the lever under the force of this bias being limited by a stud 51 secured to the plate 37 and extending through a slot in an extension 52 of the bridge 44, a short shock-absorbing spring 53 encircling the headed upper portion of the stud. To facilitate orientation, in assembly, of housing 40 with respect to the valve casing, the housing is provided at its mouth with a projection 54 which cooperates with a notch 55 cut in the flange of plate 37.

With the lever 41 in its biased position, as shown in the drawing, the closure 32 is depressed to unseated position due to the engagement of the bridge-element 48 with the closure-stem 33, the other closure 25 being seated since its stem 24 is out of engagement with the other bridge-element 49; the common valve-connection 12 therefore being in communication with connection 14 by way of passages 15—16, distribution chamber 17, port-member openings 31 and recess 30, bore 21, and passage 20. When the solenoid 47 is energized, its plunger is attracted (to an internally-stopped position) so that the lever is rocked against the force of spring 50 to depress closure-stem 24 and release the other stem 33; communication thus being established between the common connection 12 and the other connection 13 by way of passages 15—16, distribution chamber 17, port-member openings 27 and recess 26, bore 19, and passage 18.

The embodiment of my invention herein shown and described is obviously susceptible of modification without departing from the spirit of the invention, and I intend therefore to be limited only by the scope of the appended claims.

I claim as my invention:

1. In a fluid control valve: a casing having a plurality of individual passages and a common passage, all for conducting fluid with respect to the valve; means in said casing forming a distribution chamber in communication with said common passage; individual closure means for controlling communication between said distribution chamber and said individual passages; means forming another chamber at the exterior of the casing separated from said distribution chamber by a common wall; and means in said other chamber for operating said closure means and including means extending through openings in said common wall, said openings being such as to permit gradual equalization of pressure between the chambers.

2. In a fluid control valve: a casing having a plurality of individual passages and a common passage, all for conducting fluid with respect to the valve; means in said casing forming a distribution chamber in communication with said common passage; individual closure means for controlling communication between said distribution chamber and said individual passages; means forming another chamber at the exterior of the casing separated from said distribution chamber by a common wall; and means in said other chamber for operating said closure means and including a plurality of rods individually cooperable with the closure means and reciprocable in openings through said common wall; the fit of said rods in said openings being such as to prevent surge of fluid between the chambers of a magnitude sufficient to affect said operating means.

3. In a fluid control valve: a casing having a plurality of individual passages and a common passage, all for conducting fluid with respect to the valve; means in said casing forming a distribution chamber in communication with said common passage; means forming a partition between said distribution chamber and each of said individual passages and having a plurality of ports communicating with the individual passages; a closure for each of said ports; means forming another chamber at the side of said distribution chamber opposite said partition and separated from the distribution chamber by a common wall; said partition having a plurality of projections, coaxial with the individual ports, fitting in openings through said common wall; and means in said other chamber for operating said closures and including means guided in openings through said projections; the fit of said projections in said wall-openings being such as to permit gradual equalization of pressure between the chambers.

4. In a fluid control valve: a casing having a plurality of individual passage and a common passage, all for conducting fluid with respect to the valve; said casing having a recess in a surface thereof and in communication with said common passage; a plate covering said recess so as to form therewith a distribution chamber; said casing having in the side wall of said recess opposite said plate a plurality of ports communicating with said individual passages; a closure for each of said ports; means forming another chamber at the exterior of the casing and defined in part by said plate; and means in said other chamber for operating said closures and including means extending through openings in said plate; said openings being such as to permit gradual equalization of pressure between the chambers.

5. In a fluid control valve: a casing having a plurality of individual passages and a common passage, all for conducting fluid with respect to the valve; said casing having a recess in a surface thereof and in communication with said common passage; a plate covering said recess so as to form therewith a distribution chamber; said casing having in the side wall of said recess opposite said plate a plurality of ports communicating with said individual passages; a closure for each of said ports; means forming another chamber at the exterior of the casing and defined in part by said plate; and means in said other chamber for operating said closures and including a plurality of rods individually cooperable with said closures and reciprocable in openings through said plate; the fit of said rods in said openings being such as to prevent surge of fluid between the chambers of a magnitude sufficient to affect said operating means.

6. In a fluid control valve: a casing having a plurality of individual passages and a common passage, all for conducting fluid with respect to the valve; said casing having a recess in a surface thereof and in communication with said common passage; a plate covering said recess so as to form therewith a distribution chamber; said casing having in the wall of said recess opposite said plate a plurality of openings communicating with said individual passages; a valve port member secured in each of said openings and having a projection fitting in an opening through said plate; a reciprocable closure cooperable with each of said port members and each having a stem guided in an opening through the projection of the port member; means forming another chamber at the exterior of the casing and defined in part by said plate; and means in said other chamber, engageable with said stems, for operating said closures; the fit of said projections in said plate-openings being such as to permit gradual equalization of pressure between the chambers.

HARVEY E. HENRIKSEN.

REFERENCES CITED

The following references are of record in the file of this patent:

UNITED STATES PATENTS

| Number | Name | Date |
|---|---|---|
| 926,142 | Schodde | June 29, 1909 |
| 1,625,324 | Loughridge | Apr. 19, 1927 |
| 1,695,843 | Goff | Dec. 18, 1928 |
| 1,872,871 | Annin | Aug. 23, 1932 |
| 2,354,960 | Morehouse | Aug. 1, 1944 |